No. 876,305.
PATENTED JAN. 7, 1908.
J. HARTNESS.
ENGINE LATHE.
APPLICATION FILED JULY 13, 1905.
3 SHEETS—SHEET 3.
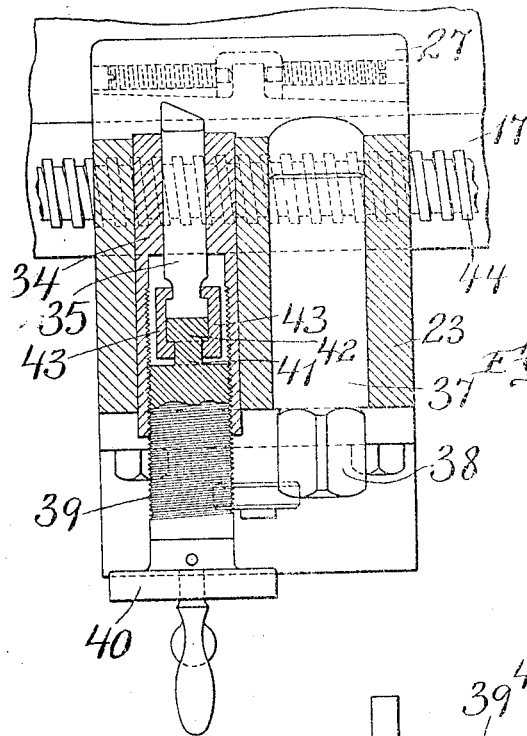
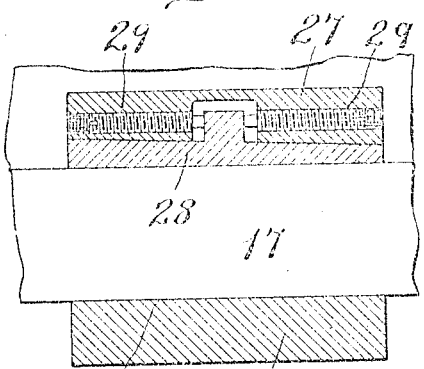
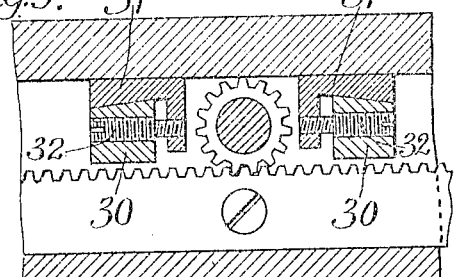
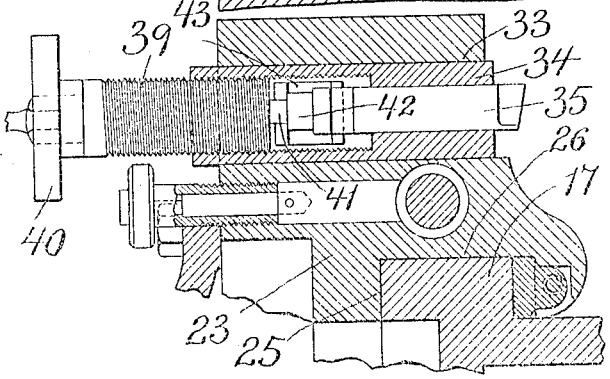
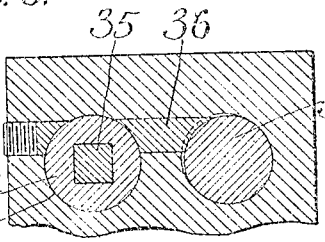
Witnesses:
W. P. Abee
E. Batchelder
Inventor:
James Hartness
by
Attorneys.

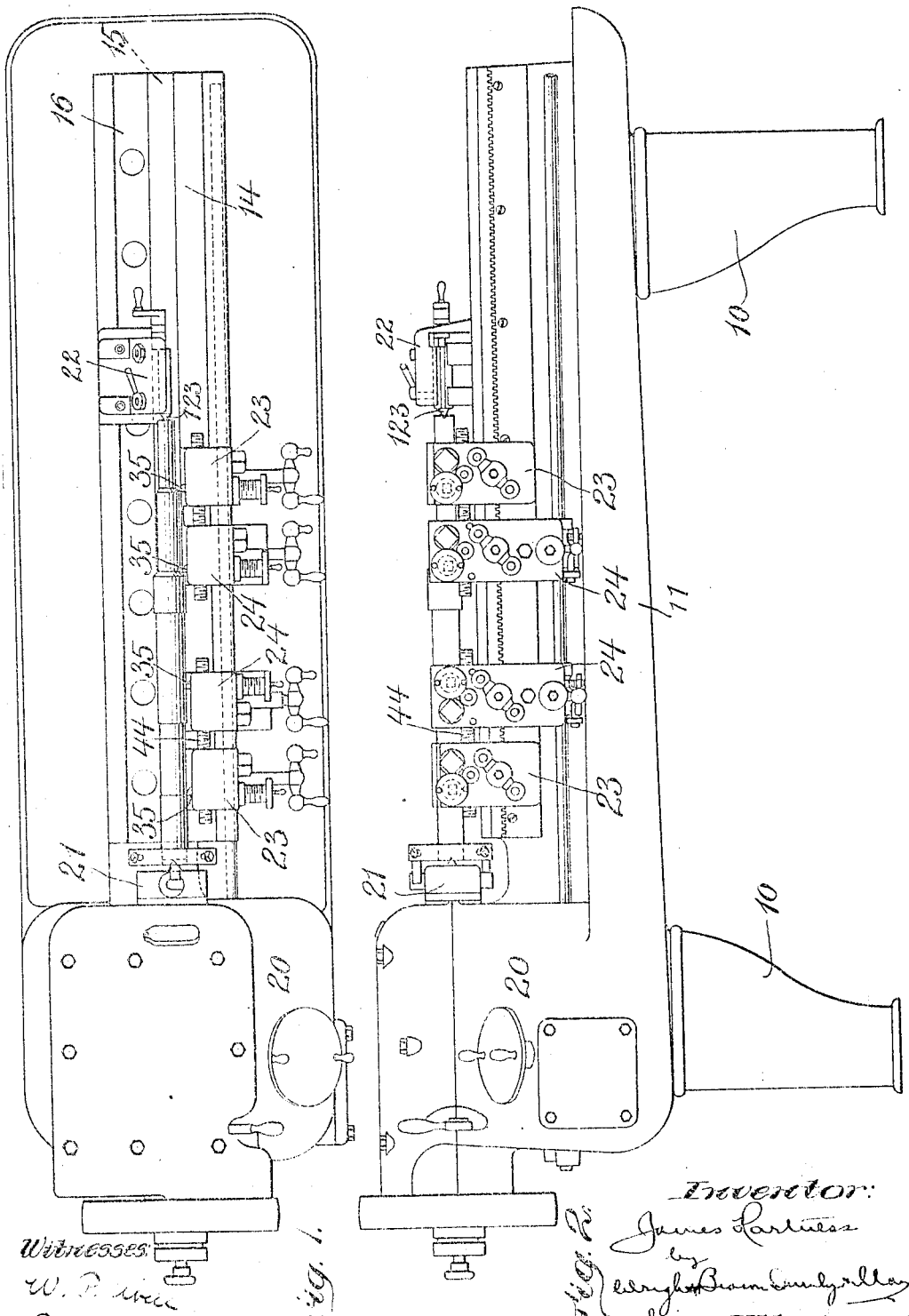

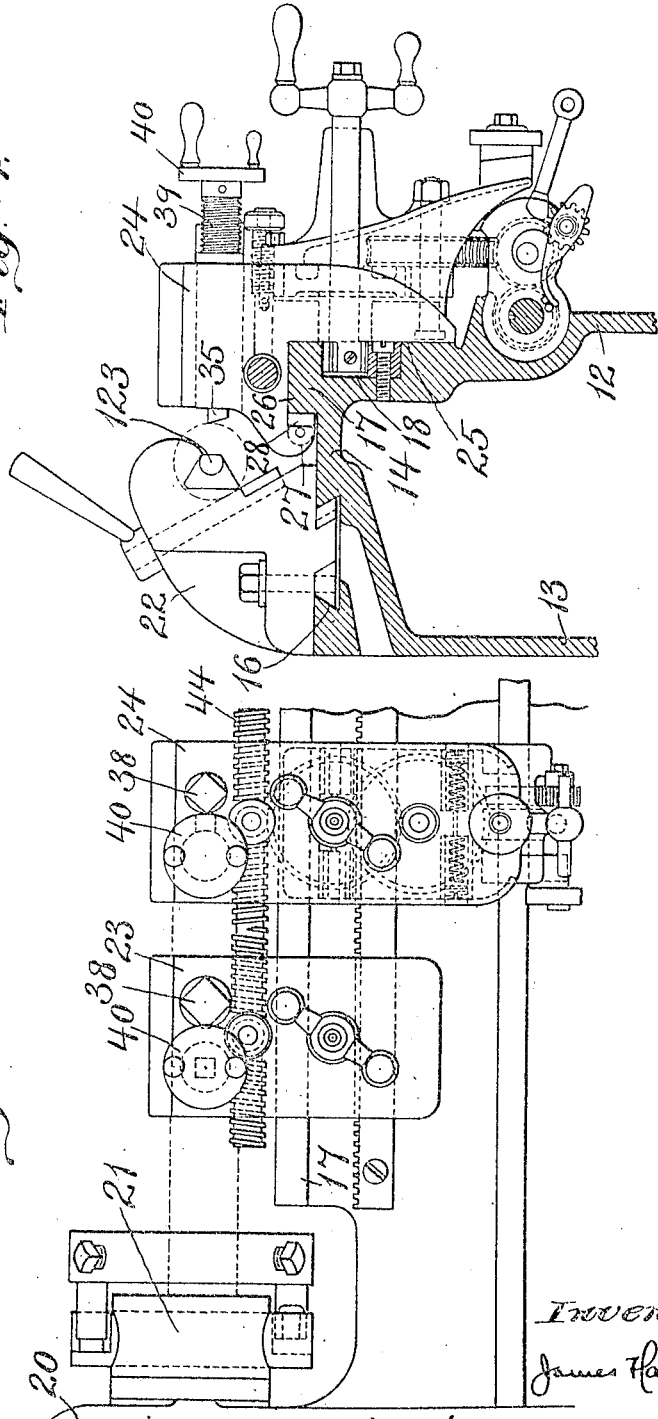

UNITED STATES PATENT OFFICE.

JAMES HARTNESS, OF SPRINGFIELD, VERMONT.

ENGINE-LATHE.

No. 876,305.  Specification of Letters Patent.  Patented Jan. 7, 1908.

Application filed July 13, 1905. Serial No. 269,477.

*To all whom it may concern:*

Be it known that I, JAMES HARTNESS, of Springfield, in the county of Windsor and State of Vermont, have invented certain new and useful Improvements in Engine-Lathes, of which the following is a specification.

This invention has relation to metal-working devices, and more particularly to engine-lathes, that is to say,—lathes for turning bar work which is held between two centers and while so held, is turned or otherwise worked upon by suitable tools held in a slide on the bed.

According to the tenets of lathe construction, it has been generally customary to provide the top of the bed with parallel ways or shears upon which a slide is mounted to travel and to move such slide by gearing actuated either manually or by power. Such lathes for turning bar work of, say, 3 1/2 to 4 inches in diameter, have been heretofore so constructed, in order to give the requisite stability to each of the elements forming part of the slide that a swing of about eighteen inches was the result; that is to say, the centers have been arranged far enough above the shears to accommodate all of the parts that have been considered essential in a lathe for turning work of the size referred to. As a result of this construction, there is considerable spring in the tool and the parts supporting it, and an inherently weak arrangement owing to the long distance between the point of the tool and the bearing which the main slide has upon the bed. The strains which the cutter or tool and the tool-holder experience when the cutter is operating upon the work tend to swing them about an axis, as for instance, over twelve inches or more from the work, or at the point where the main slide takes bearing on the bed. This renders it possible for the parts to spring and permit the tool to move more or less away from the work and to "chatter" thereagainst; thereby preventing accuracy in the results of the operation and prevents the removal of as large a chip as is regarded as desirable in modern machine shop practice. Moreover, this results in the expenditure of a great length of time to finish the work and therefore an increased cost in producing the finished work.

The primary object of the present invention is to provide a lathe for the turning of bar stock of any desired diameter up to predetermined limits (say of 3-1/2 or 4 inches in diameter,) in which the strains on the tool and holder may be borne directly by the bed, so as to prevent the springing of the tool or its holder and permit the removal of a relatively large chip with the results attendant thereupon. This is accomplished, according to my invention, by securing the tool directly to the main slide and by bringing the centers and the bed close together with solid metal between them and with no loose sliding joints, so that there shall be a minimum distance between the work and the point at which the slide takes bearing on the bed and no possible yielding at the point of the tool. In accomplishing this, I eliminate the "cobhouse" construction, as I term it, or one in which the tool surmounts a high pile of slides and bridges.

The invention is designed to accomplish other desirable results and is possessed of numerous features of construction and arrangement of parts, all of which are set forth in the following specification and pointed out in the appended claims.

Referring to the accompanying drawings which illustrate one embodiment of the invention, to which, however, I am not limited,—Figure 1 represents in plan view an engine lathe. Fig. 2 represents a front elevation of the same. Fig. 3 represents in front elevation the middle portion of the lathe for the purpose of illustrating the tool carriage. Fig. 4 represents a transverse vertical section through the same portion of the lathe. Fig. 5 represents in horizontal section a portion of the tool slide and illustrates the gib at the rear of the guide or shear on the bed. Fig. 6 illustrates a horizontal section through the tool slide and illustrates the cutter and its adjuncts. Fig. 7 represents a vertical transverse section on the line of the cutter. Fig. 8 illustrates the means for locking the cutter bar against movement. Fig. 9 shows the gibs for preventing upward movement of the slide.

The lathe-bed and main body of the headstock are all preferably made of one "mother" casting which rests upon the uprights or legs 10. The bed consists of a relatively flat, shallow, quadrilateral pan 11, the bottom of which slopes toward the headstock. The front and rear walls of the pan are upturned, as is the wall at the tail-end, so that the pan is adapted for the reception of chips and oil. Between the front and rear walls of the pan, there is a bed-box upon which the tool-slide moves. This bed-box is formed by casting the bed with upright front and rear walls 12 13 (between the walls of the pan) with a top wall 14. This box has an end wall 15, and is closed except at the bottom. The walls 12 13 are braced by transverse webs or ribs, (not shown) so that it is very strong and rigid, being with the pan and headstock a "mother" casting, as it may be termed. The end wall of the pan extends out beyond the end wall 15 of the box, as shown in Fig. 2. The box is relatively narrow. At the head end the box is cast integrally with one end wall of the headstock. This headstock at its base is substantially as wide as the pan and in fact its front and rear walls are upward continuations of the front and rear walls of the pan.

Referring again to the bed-box, it will be observed that it is provided at its upper surface near the rear wall with a dovetailed groove 16, which I may utilize for supporting and guiding a work-rest and the tail-stock. The front wall 12 of the box is relatively thick and directly above it on the top of the box is a rail guideway or shear 17. The front of the wall 12 is recessed at 18 so that the shear 17 has four surfaces or walls against which different surfaces of the tool slide or gibs carried thereby may be engaged. The shear in cross section as shown in Figs. 4 and 7, is substantially quadrilateral in form, with a front and rear plane surface and a top and bottom plane surface, as clearly illustrated. This shear or guide is located, as stated, at the front of the bed-box and is the only one upon which the tool-slide or slides is or are mounted.

In the headstock 20 is journaled a spindle 21 and variable speed mechanism for rotating it. On the bed is a tailstock 22 which is movable toward and from the spindle. This carries a tail center or dead spindle 123, between which and the spindle the work is supported.

I may employ one or a plurality of tool-slides, but before describing them, I shall call attention to the fact that the axis of the spindle is close to the top wall of the bed-box instead of being located at some distance therefrom, as in prior engine lathes. As this lathe is designed, as previously stated, only for the turning of bar stock, and not for chucking work, it will be seen that where it is built for turning stock of not over 3½ or 4 inches diameter, the centers are located at approximately 2½ inches above the top of the shear 17.

The tool-slides illustrated upon the drawing are four in number, but it will be remembered, of course, that I may employ one, two, three, or more than four, if it be desired. These slides are indicated in Fig. 2 by the numerals 23 23 24 and 24. The slides 23 23 are exactly alike; and though the slides 24 24 are alike, they differ somewhat from those at 23 23 in that they are provided with gearing for moving them.

I will first describe one of the slides at 23. This slide consists of a casting which may be of any suitable shape, although in front elevation it is oblong in form. It has a rear face 25 which bears flat against the perpendicular front face of the bed-box. At right angles to said face 25 is a bottom face 26 which rests flat upon the top surface of the guide or shear 17, and it is further provided with a depending portion 27, which extends down behind the rear wall of the shear 17. The portion 27 projects rearwardly from the main part of the slide, and between it and the rear face of the shear there is placed a tapered gib 28 which may be adjusted for wear by set-screws 29 which are passed into the portion 27 in opposite directions and engage a lug on the gib, as shown in Fig. 5.

In order to bind the slide upon the top face of the shear, the slide is provided with lugs 30 30 which project under the under face of the shear into the groove 18 and between the upper portions of the lugs and the shear are tapered gibs 31 31 having downwardly projecting ends which are engaged by screws 32 passed in opposite directions through the lugs 30. Each of these screws is threaded right and left to secure a quick adjustment of the gibs. Now by this construction it will be seen that the slide is securely held against play in any direction transversely of the bed-box. The rear face of the slide is shown in Fig. 4, as being substantially coincident with the rear face of the shear 17, and is approximately near the center of rotation of the work, so that the end of the tool which is secured therein, as will be explained, is substantially directly above and only slightly to the rear of the shear, so that the thrust is taken directly by the bed through a solid casting, i. e., the slide. The slide itself is solid except for the apertures which receive the various operative mechanism including the tool. The slide has through it an aperture 33 substantially in the same horizontal plane as the axis of the spindle, and in this aperture is placed a bushing 34, in which is placed the cutter or tool 35. This bushing may be cylindrical and is adapted to be tightly bound in the aperture by a pin 36 which bears against a cam-pin 37 which is also passed into the slide from the front. The pin has the squared end 38 by which it may be rotated to force the pin 36 tightly against the bushing 34 to securely wedge it in place against movement in any direction. It will be noted that the pin 36 is located in a plane above the axis of the bushing, so that it operates to force the bushing down against the seat firmly thus preventing the tool carried thereby from yielding. The front end of the bushing is hollowed out and is internally threaded to receive an adjusting screw 39 of relatively large diameter having upon its end a wheel or knob 40 by which it may be rotated. From the inner end of the screw, there projects a lug 41 having a head 42 which is adapted to abut directly against the headed end of the cutter 35. The two heads of the screw and the cutter are connected together by a suitable connection 43 which may be formed in any suitable way to provide shoulders to engage said heads. By reason of this construction, the tool may be adjusted longitudinally of its length towards and from the work. It will be observed in this connection that the tool is substantially angular in cross section and that the aperture in which it is placed is complemental to such angularity. The tool, as shown in Fig. 28, projects a very short distance beyond the rear face of the slide, so that there is no chance for its springing appreciably. The strain upon the tool and the slide is downward and forward, and it is borne by the top and rear face of the shear, as well as by the front face of the shear at the lower end of the slide, so that there is no chance for the slide to give or any parts thereof to spring. This I regard as one of the most essential features of my present invention, and one in which the invention differs from all other engine lathes.

There is no multiplicity of slides or lever-like parts in this construction which can yield. The slide is solid and rigid, the tool is supported practically solidly thereon, and the slide is solid on the bed, and moreover, as stated, the slide is brought so close to the work that there is no long overhang of the tool. The slides 23 are connected to the slides 24 by right and left hand screws 44, by which they may be adjusted toward and from each other. Any suitable mechanism is utilized for transmitting power to the slides 24 to move them (and the slides 23) longitudinally of the bed.

It will be quite apparent that in addition to the objects which I have set forth in the preamble, the invention is intended to meet a variety of other requirements. In the first place, the bed, as a whole, is solid and extremely rigid. Each tool slide is light, as compared with its strength and rigidity and weighs very much less than the ordinary slide. It is my opinion that the wear occasioned by the slide and the bed in ordinary engine lathes is due not so much to the work accomplished by the slide, as to the heavy weight of the slide. According to my construction, it may be said, in somewhat exaggerated language perhaps, that the tool-slide weighs ounces while those on engine lathes as heretofore constructed have weighed pounds. For instance, in one form of this machine which I have constructed, each carriage weighs from forty to sixty pounds, whereas in the commercial, light eighteen-inch lathe, the carriage weighs usually from 350 pounds upwardly. Yet even though the slide is extremely light, nevertheless it is of such solid and rigid construction and is so supported by the bed in close proximity to the axis of of the spindle, that the cutter may be secured directly to it without overhang, as to prevent any springing of the parts; and consequently, the lathe will meet all requirements found necessary in the turning of high-speed steel, and will enable the removal of a larger chip than has been heretofore found practicable with engine lathes of the usual construction. The tool is slid practically upon the bed with a minimum distance between it and the bed, and with just enough metal to make a good sliding surface. This metal is subjected practically only to compression strains. This in turn enables the user of my invention to produce finished work at less cost than heretofore, and in greater quantities within a given time.

Having thus explained the nature of the invention, and described a way of constructing and using the same, although without attempting to set forth all of the forms in which it may be made, or all of the modes of its use, I declare that what I claim is:

1. In an engine lathe, a bed, a spindle located approximately near the bed, a single slide supported directly on the bed and arranged in close proximity to the axis of said spindle, a cutter supported directly on the slide, and means for positively feeding the cutter relatively to said slide towards and from the work held by the spindle substantially as set forth.

2. In an engine lathe, a bed, a single slide or carriage movable longitudinally of the bed, a cutter socketed in said slide, and means for positively adjusting said cutter transversely of the movement of the slide, making it possible to bring the solid metal of the slide close to the work to support the cutter and prevent it from springing, all without the interposition of supplemental slides or lever-like parts.

3. In an engine lathe, a bed, a cutter adjustable towards and from the work, a slide mounted directly on and supported by the bed, said slide being longitudinally movable on said bed and having a socket for receiving and directly supporting the cutter without the interposition of additional slides, and a screw on said slide and connected to said cutter for longitudinally adjusting said cutter relatively to said slide.

4. In a lathe, a bed, a longitudinally movable slide mounted directly thereon, having a socket, a cutter closely fitted in said socket and longitudinally movable therein, and means for adjusting said cutter in said socket.

5. In a lathe, a bed, a longitudinally movable slide mounted directly thereon, having a socket, a cutter closely fitted in said socket and longitudinally movable therein, a screw threaded into said slide, and a connection between said screw and said cutter substantially as set forth.

6. In an engine lathe, a spindle, a bed box, and a slide resting upon said bed box and having a solid integral portion extending upward past the horizontal plane of the spindle axis to receive the cutter directly therein, a cutter fitted into said slide and means for feeding said cutter toward the work.

7. In an engine lathe, a bed whose top surface and front wall form an angle, a slide which bears upon said front wall and rests upon said top surface, a gib on the slide extending into a groove in the front wall and bearing upwardly against the upper wall of the groove, a vertical upright guiding surface on the bed between the front and rear walls thereof, and a gib on the slide bearing forwardly against said rear guiding surface.

8. In an engine lathe, a spindle, a bed-box having a shear along its top above its front wall, a tool slide gibbed to said shear, a cutter socketed in said slide and having its cutting point substantially on said shear, and means for adjusting said cutter towards and from the work.

9. In an engine lathe, a spindle, a bed box having a shear along its top at its front edge, a tool slide overhanging the front wall of the bed-box and bearing against the upper and rear walls of said shear, said slide extending upward to a horizontal plane above the axis of the spindle, and a cutter fitted in a socket in said slide and projected therethrough and means for feeding the cutter longitudinally of its length, substantially as set forth.

10. In an engine lathe for turning bar work, a bed-box and work centers located in close proximity, a solid tool slide gibbed to slide on the bed and located with an integral portion in close proximity to the axis of the work centers, a cutter socketed in said slide without the interposition of supplemental slides or lever-like parts, and means for feeding said cutter in its socket to and from the work.

11. In an engine lathe, a spindle, a bed-box having an upright rear guide-wall in front of a vertical plane coincident with the work axis, a forwardly projecting under surface or wall at an angle to said vertical wall, and a rest-wall or surface above said under wall; a tool slide supported directly upon said rest-wall or surface with faces bearing against said rear wall and said under wall or surface, said slide projecting upwardly as a solid structure and having a socket; a cutter fitted in said socket in said structure and projecting rearwardly towards the work, whereby the working strains on the tool are transmitted through solid material directly to the bed-box, and positive means for sliding said cutter in said socket towards and from the work.

In testimony whereof I have affixed my signature, in presence of two witnesses.

JAMES HARTNESS.

Witnesses:
MARTIN J. MEARA,
C. PRENTZBEIR.